UNITED STATES PATENT OFFICE.

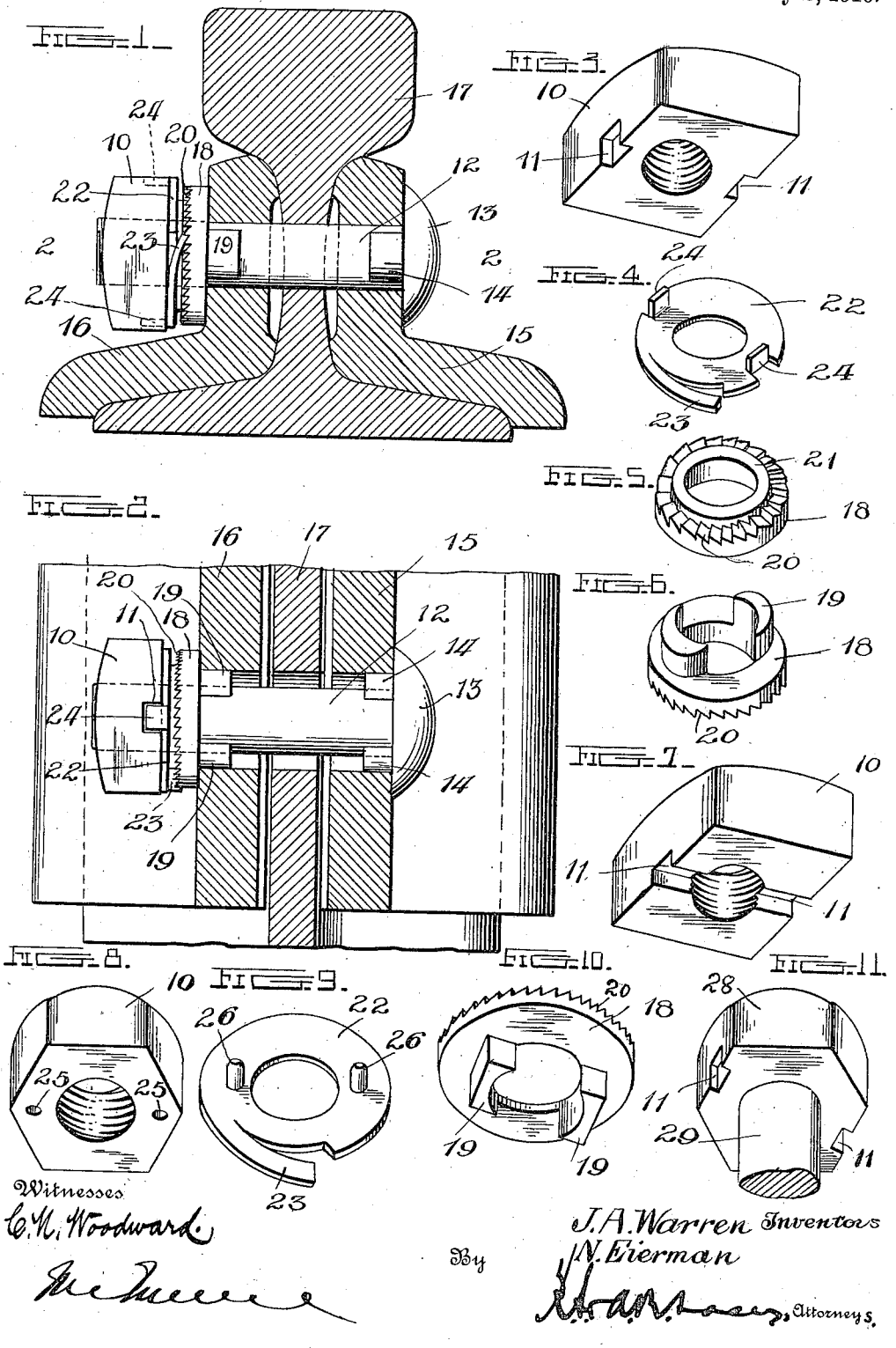

JAMES A. WARREN AND NICHOLAS EIERMAN, OF WAHA, IDAHO.

NUT-LOCK.

1,181,494. Specification of Letters Patent. Patented May 2, 1916.

Application filed February 12, 1914. Serial No. 818,366.

*To all whom it may concern:*

Be it known that we, JAMES A. WARREN and NICHOLAS EIERMAN, citizens of the United States, residing at Waha, in the county of Nez Perce and State of Idaho, have invented certain new and useful Improvements in Nut-Locks, of which the following is a specification.

This invention relates to improvements in devices for preventing the retrograde movement of nuts upon bolts or of bolts in the bodies in which they are engaged, for instance bolts of the set-screw form, and has for one of its objects to improve the construction and increase the efficiency and utility of devices of this character.

Another object of the invention is to provide a simply constructed device which may be attached without material structural change to nuts or bolts of various forms and sizes and to devices of this class employed for any purpose.

Another object of the invention is to provide a device of this character which may be applied without material structural change to wood or metal structures.

With these and other objects in view the invention consists in certain novel features of construction as hereinafter shown and described and then specifically pointed out in the claim.

The improved device is designed more particularly for use in connection with railway rail joints, but may be employed upon other structures, and in the drawings the improved device is shown applied to a conventional railway rail joint, and—

Figure 1 is a transverse section of a conventional railway rail joint including the rail and the clamp plates and one of the clamp bolts with the improvement applied. Fig. 2 is a section on the line 2—2 of Fig. 1. Fig. 3 is a perspective view from beneath of the nut. Fig. 4 is a perspective view from above of the outer washer. Fig. 5 is a perspective view from above of the inner or bearing washer. Fig. 6 is a perspective view from beneath of the inner or bearing washer. Fig. 7 is a perspective view from beneath of a modified form of nut. Fig. 8 is a perspective view of another modified form of the nut. Fig. 9 is a perspective view from above of the outer washer employed in the modified construction shown in Fig. 8. Fig. 10 is a perspective view from beneath of another form of the inner washer. Fig. 11 illustrates the manner of applying the improved device to a headed bolt, such as a set screw or the like.

Corresponding and like parts are referred to in the following description and indicated in all the views of the drawings by the same reference characters.

The improved device in its simpler form comprises a nut 10 of the usual form and having recesses or sockets 11 in its inner side. The recesses or sockets may be in the form shown in Fig. 3 and extending for a short distance only into the body of the nut, or formed entirely through the body of the nut transversely as shown in Fig. 7, or in the form of holes or cavities, as shown in Fig. 8, and it is not desired therefore to limit the invention in this respect.

The bolt, indicated at 12, is of the usual form employed in railway rail joints and provided with a head 13 and with lateral projections 14 next to the head to enter into the cavities made therefor at the side of the bolt opening in the clamp plate 15. The clamp plates, represented conventionally at 15—16 bear upon opposite sides of the web of the rail, indicated conventionally at 17, the bolt apertures in both of the clamp plates 15—16 being elongated in the usual manner so that the bolt may be inserted from either side.

The improved device likewise includes an inner or bearing washer 18 engaging around the bolt and against the adjacent portion of the clamp plate 16 and provided with projections 19 to engage in the elongated aperture at the sides of the bolt opening as shown more clearly in Fig. 2. The projections 19 conform in outline to the projections 14 of the bolt, so that the bolt may be inserted through either of the clamp plates and the washer member 18 applied to the other clamp plate. By this means the improved device may be applied from either side desired.

The face of the washer member 18 next to the projections 19 is flat, and bears flatly against the adjacent face of the plate 16 and is formed with radial ratchet teeth 20 in its outer face, the outer face of the member 18 being preferably formed with a flat annular face 21 between the teeth 20 and the interior of the washer member, as shown more clearly in Fig. 5. The ratchet teeth 20 will be spaced apart the least possible distance so that the nut may be held at correspondingly short intervals.

Bearing upon the flat face 21 of the member 18 is an outer washer or disk 22 having a segmental cleft at one side whereby a tongue 23 is formed with the outer terminal of the tongue bent below the general face of the washer. The washer 22 is likewise formed with clefts at opposite sides to form portions which are adapted to be bent at right angles to the body of the member 22 to form tongues as represented at 24. The tongues 24 are designed to be bent into the recesses 11 after the nut has been "turned" home. By this means it will be obvious that a simply constructed and effectual device is produced whereby the nut is effectually held from retrograde movement upon the bolt, while the bolt is held from rotary movement within the rail joint.

In Figs. 8 and 9 a modification in the construction is shown consisting in forming the nut 10 with sockets 25 in the lower face instead of the recesses 11 and forming the outer washer 22 with pins 26 instead of the tongues 24, to enter the sockets 25 and thus prevent retrograde movement of the nut. In the modified structure shown in Figs. 8 and 9, the inner washer device illustrated in Fig. 5 may be employed, or a washer illustrated in Fig. 10 may be used with the projections 19 formed with angular outer faces instead of in oval shape, as shown in Figs. 5 and 6. The form of projections shown in Fig. 10 will generally be employed when the bolt 12 is inserted through wood structures.

When the improved device is applied to soft wood, such as pine, or the like, the square projections 19 may be forced into the wood by the blow of a hammer or sledge before the washer 22 and nut 10 are applied, the wood not requiring cavities to be made for the member 19 prior to the application of the improved device.

In Fig. 11 the improved device is shown applied to the head 28 of a set screw 29, but this does not constitute a departure from the principle of the invention as the operation and results produced are the same.

Having thus described the invention, what is claimed as new is:

A device of the character described including a nut bored to receive a bolt and provided with notches in the lower margins of opposite side faces thereof, a locking member apertured to receive the bolt and provided upon one side thereof with oppositely disposed and laterally projecting work engaging lugs having concave faces confronting the bolt and upon its opposite side with a ratchet, a locking washer interposed between the locking member and the nut and having a portion of its outer margin released to provide a pawl adapted to coact with the ratchet of the locking member, and oppositely disposed upstruck lugs carried by the washer and engaging in said notches of the nut with the free ends of said lugs housed within the notches.

In testimony whereof we affix our signatures in presence of two witnesses.

JAMES A. WARREN. [L. S.]
  NICHOLAS EIERMAN. [L. S.]

Witnesses:
  FRED STEVENSON,
  H. LYNN JACKSON.

Copies of this patent may be obtained for five cents each, by addressing the "Commissioner of Patents. Washington, D. C."